(12) United States Patent
Bader et al.

(10) Patent No.: US 11,453,330 B2
(45) Date of Patent: Sep. 27, 2022

(54) VEHICLE PERIPHERAL LIGHTING SYSTEM

(71) Applicant: Federal Signal Corporation, Oak Brook, IL (US)

(72) Inventors: Joseph F. Bader, Monee, IL (US); Nicholas L. Nakatsuka, Highland, IN (US); Christopher Radzik, Orland Park, IL (US)

(73) Assignee: Federal Signal Corporation, Oak Brook, IL (US)

( * ) Notice: Subject to any disclaimer, the term of this patent is extended or adjusted under 35 U.S.C. 154(b) by 227 days.

(21) Appl. No.: 16/826,805

(22) Filed: Mar. 23, 2020

(65) Prior Publication Data
US 2020/0307445 A1    Oct. 1, 2020

Related U.S. Application Data

(60) Provisional application No. 62/825,504, filed on Mar. 28, 2019.

(51) Int. Cl.
*B60Q 1/28* (2006.01)
*B60Q 1/26* (2006.01)
*H04W 4/80* (2018.01)
*H04W 4/48* (2018.01)

(52) U.S. Cl.
CPC ............ *B60Q 1/28* (2013.01); *B60Q 1/2638* (2013.01); *H04W 4/48* (2018.02); *H04W 4/80* (2018.02)

(58) Field of Classification Search
CPC ...... B60Q 1/0035; B60Q 1/2638; B60Q 1/28; B60Q 1/46; B60Q 1/52; H04W 4/48; H04W 4/80
See application file for complete search history.

(56) References Cited

U.S. PATENT DOCUMENTS

| | | | |
|---|---|---|---|
| 6,778,078 B1* | 8/2004 | Han | G08B 3/10 340/384.4 |
| 9,283,887 B1 | 3/2016 | Carpenter | |
| 9,499,095 B1* | 11/2016 | Buehler | B60Q 1/2611 |
| 9,725,031 B2 | 8/2017 | Carpenter | |
| 9,751,457 B1 | 9/2017 | Buehler | |
| 9,767,703 B2 | 9/2017 | Baker | |
| 2007/0195939 A1* | 8/2007 | Sink | H04L 41/00 379/37 |
| 2007/0242472 A1* | 10/2007 | Gergets | F21S 45/10 362/493 |
| 2010/0315376 A1* | 12/2010 | Choi | G06F 3/0421 345/175 |
| 2012/0119900 A1* | 5/2012 | Walther | B60Q 1/268 340/474 |
| 2016/0144777 A1* | 5/2016 | Carpenter | B60Q 1/0088 340/471 |
| 2016/0159278 A1* | 6/2016 | Baker | G09B 9/00 340/471 |

* cited by examiner

*Primary Examiner* — David Bilodeau
(74) *Attorney, Agent, or Firm* — Merchant & Gould P.C.

(57) ABSTRACT

Peripheral lighting system for an emergency vehicle. In an example, the lighting system has a plurality of light heads configured to be located at various positions on the emergency vehicle. A system controller is programmed to individually control each of the light heads via each a plurality of serial communications lines from the controller to the light heads.

17 Claims, 13 Drawing Sheets

VEHICLE PERIPHERAL LIGHTING SYSTEM

BACKGROUND

Vehicular emergency warning systems are used to inform the public that an emergency vehicle is in emergency response mode traveling to an emergency or is at or near an emergency scene. For example, when an emergency vehicle is asking for the right of way, both the siren and the emergency warning lights should be operating at maximum capability to provide the most effective warning to the public.

When the emergency vehicle is in a less critical response mode or in blocking mode, the emergency lights may be used without the siren, but when asking for the right away, the siren should always be used, as lighting systems are less effective during daylight hours and light as a warning signal is limited in effectiveness due to opaque objects such as vehicles or structures between those being warned and the emergency vehicle.

SUMMARY

Aspects of the present disclosure relate to a peripheral lighting system for an emergency vehicle, comprising: a plurality of light heads configured to be located at various positions on the emergency vehicle; a system controller; and a serial communications line extending from the system controller to each of the plurality of light heads; wherein the system controller is programmed to individually control each of the plurality of light heads over the serial communications line.

DETAILED DESCRIPTION

Figure 1:
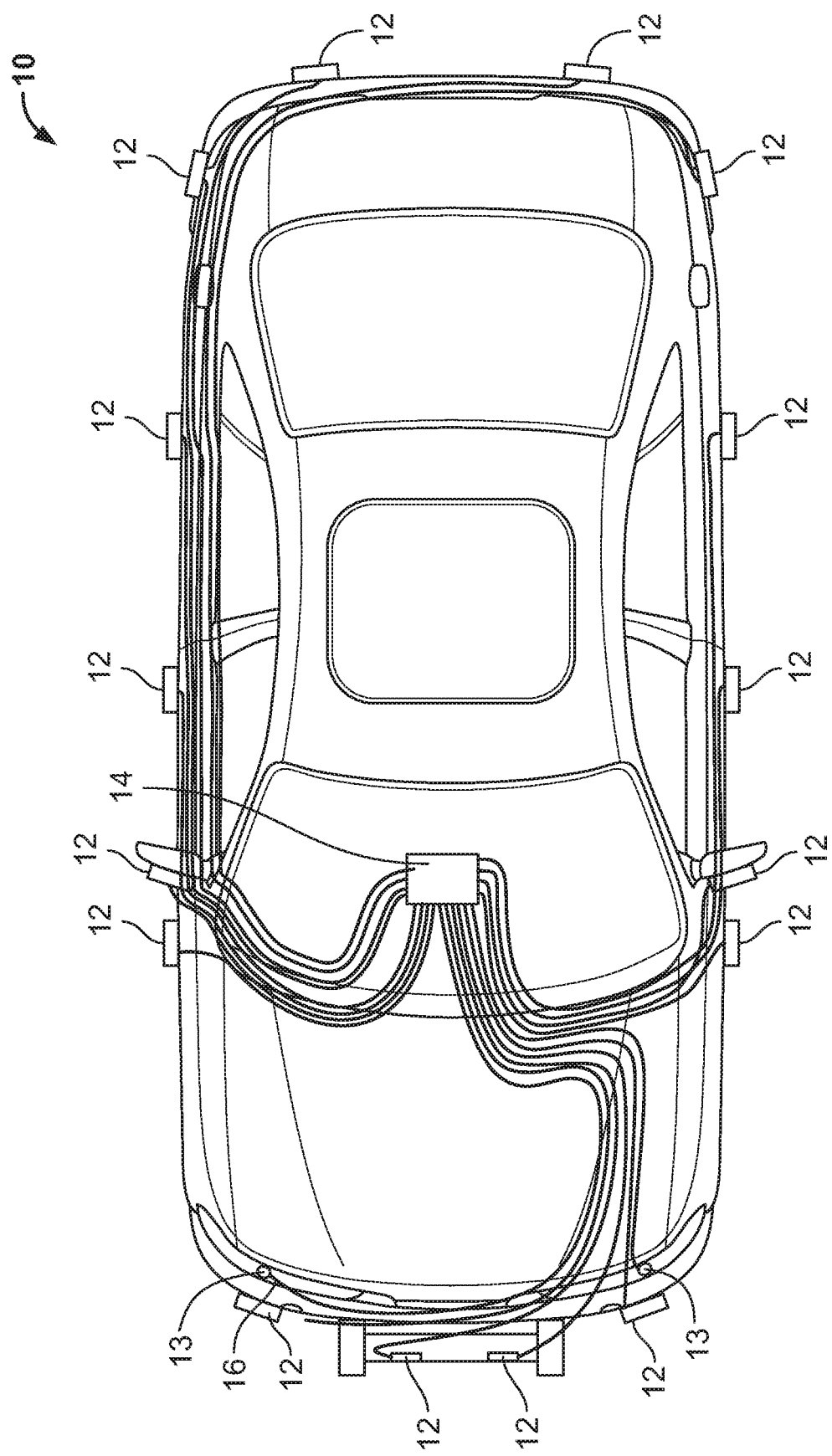
FIG. 1 illustrates an emergency vehicle with an example prior art control system for a plurality of peripheral light heads.

Emergency vehicles utilize auxiliary warning lights around the periphery of the vehicle to augment the warning effectiveness of the primary emergency lighting system. For example, warning lights are often located on the front of the vehicle, either mounted to a bumper mounted push bumper or within or on the front grill of the vehicle, or within the headlamp housings on the front of the vehicle. These front mounted lights can be aimed either straight forward to help notify vehicles directly to the front or they can be angled as much as 90 degrees sideways in order to notify vehicles approaching an intersection, as these forward mounted lights are the first lights to penetrate the crossing lanes when the emergency vehicle enters an intersection.

Side mounted peripheral warning lights are also utilized to improve side warning effectiveness, as emergency vehicles in emergency response mode going through an intersection or in blocking mode sitting in the intersection, pose a hazard to vehicles approaching the intersection from different angles. It is not unusual for the emergency vehicle to be sitting sideways in an intersection or on the roadway in blocking mode to create a barrier and protect the emergency response scene from oncoming vehicles.

Rear mounted peripheral warning lights are used to provide extra warning to the rear of the vehicle to provide protection for the emergency vehicle when blocking in a lane or on the shoulder. These rear facing lights help to notify those that are behind a moving emergency vehicle that if the rearward lights are flashing and you hear the emergency vehicle's system, the emergency vehicle is in emergency response mode and that drivers behind that emergency vehicle should stay back and not follow that vehicle.

Color of the lights on emergency vehicles can vary, with the predominant colors being red, blue, amber and white. Often the peripheral lights have primary and secondary modes of operation. These modes of operation are generally used to create higher lighting system activity during emergency response and less lighting activity when blocking. Typically, the flash patterns are more rapid in emergency response mode than in blocking mode.

As technology has progressed and it has become feasible to incorporate white light into emergency warning lights, the warning lights are able to provide another utility and that is area and scene lighting. When blocking at a scene, some of the lights in the emergency warning system can change modes and be used to flood white light into the emergency scene.

White light has also become more prevalent as an ancillary color in emergency response mode as higher levels of white light produced by modern LEDs enable the emergency warning system to provide more light by flashing white light between the flashes of colored light during emergency response mode.

This increased flexibility in the lights on an emergency vehicle makes the installation of the emergency warning lighting system more complex, especially when installing peripheral lights on the vehicle. It is not unusual to have up to 4 or more wires connecting to each peripheral light to activate the various modes of operation, such as: Wire 1 Mode 1—single flash blue; Wire 2 Mode 2—double flash blue and white; Wire 3 Mode 3 steady burn white for scene lighting; and Wire 4 is the ground wire.

Referring to FIG. 1, FIG. 1 illustrates an emergency vehicle 10 with a prior art wiring system for a plurality of peripheral light heads 12. The light heads 12 have local ground connections. The vehicle 10 includes a central controller 14 for which power and ground connections are required. Tri-colored lights 13 are connected to three-conductor looms 16. As shown in FIG. 1, with this type of flexibility in the peripheral light heads 12, it would not be unusual for an emergency vehicle to have between 6 and 16 peripheral light heads, with several wires connecting between the lighting controller and each light head.

Figure 2:
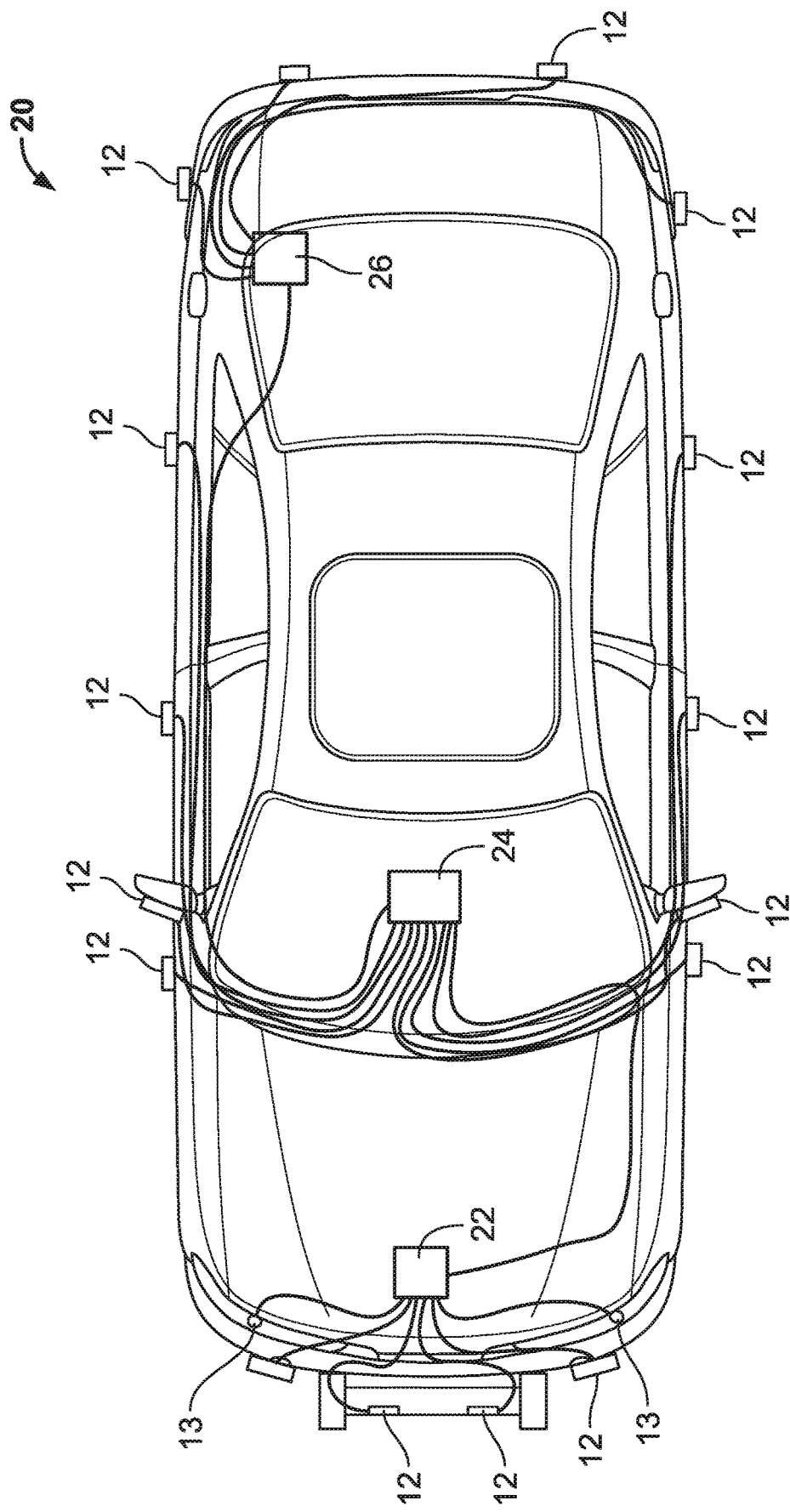
FIG. 2 illustrates an emergency vehicle with a further example prior art control system for a plurality of peripheral light heads.

This flexibility has greatly increased the wiring complexity and the installation time for the lighting system on the emergency vehicle. Some suppliers in the emergency vehicle lighting market have created remote node modules that help to mitigate some of this complexity by placing individual lighting controller nodes closer to the peripheral lights. For example, referring to FIG. 2, it is possible to have one peripheral lighting node 22 in the front of the vehicle 20, one lighting node 24 in the center of the vehicle and one lightning node 26 in the rear of the vehicle. The lighting node 24 is a central controller for which power and ground connections are required. The front node 22 requires power and ground connections. The rear node 26 requires power and ground connections. Although this does shorten the length of the wires between the node and the peripheral lights when compared to a single centrally mounted or rear mounted controller, it does not reduce the number of wires connected between the controller/nodes and each peripheral light head. There is a serial communications line between the central controller 24 and the front node 22.

One advantage of having a central controller or a multi-node controller connected to peripheral light heads is that each peripheral light head is connected to an individual output on the central controller or a controller node. When mass producing vehicles, this makes it easier to build the vehicles without having to individually program the lighting system as during the installation process, each peripheral light head is always connected to the same light head output on the controller or node.

For example, a peripheral warning light head mounted inside the driver's side headlamp housing is always connected to light head output 3 on the controller, while the peripheral light head mounted inside the passenger side headlamp housing is always connected to light head output 4 on the controller. This method of connecting each of the peripheral light heads to the same output of the controller repetitively on different vehicles makes it easy to program the flash patterns on the vehicles simply by copying the flash pattern data file from vehicle to vehicle. This means that complexity of the wiring of the emergency warning system is a trade-off for ease of programming like configured vehicles.

It is not unusual for a typical police vehicle to have 20 hours of labor dedicated just to the installation of the emergency warning system. Typically, the entire interior of the vehicle is removed, along with the front nose of the vehicle. This is done so complex wire harnesses can be routed throughout the vehicle to connect the emergency lighting controller to the light bar and all of the peripheral light heads mounted around the vehicle.

In modern computer networks, a different approach is taken where multiple computers are connected together on the same wires, fiber optic cable or wireless signal. These networks enable multiple like devices to be connected to the same line and, using serial communications protocol, enables the computers to connect to a central server or to each other without running individual wires in a matrix array. All of the computers share the same wire, fiber line or radio frequency connection.

To achieve this method of communications between devices on a single line, each individual device on the network must have its own identification or number, much like a post office address for a home. By having an individual address for each computer, the network knows how to route signals between one computer and another, much like the post office can deliver mail to your home. Your home and an individual computer on the serial line has its own distinct address.

As we have shown, modern emergency warning lighting systems have taken a first step of trying to simplify the system by adding remote controller nodes, with each node having its own distinct address on the serial communication line, but these systems have not taken the next step of extending serial communications directly to the individual light heads. This is because once serial communications is extended to the individual light heads, the ability to copy flash pattern software from like vehicle to like vehicle is lost. That is because on a serial peripheral lighting system, each individual light head would need to have its own distinct address on the serial line.

For example, a peripheral light head mounted in the driver's side headlamp housing on one vehicle could have serial address 10A0C3, while a peripheral light head mounted in the same driver's side headlamp housing on a second vehicle could have serial address 1F00B8. This is because during manufacturing of the light head, the manufacturer would not repeat any serial numbers, because if matching serial number light heads ended up on the same serial connection, a communications conflict would occur on that serial network. This is why computers on a local area network are assigned their own, individual IP address.

This means even though two emergency vehicles are built as clones of each other with peripheral light heads mounted in the same physical locations around the vehicle, the same flash pattern configuration cannot be copied from one vehicle to the other, because the serial numbers of the light heads on each vehicle do not match, so the software does not know which light head is mounted where, as several light heads share the same serial communications line.

In modern communications networks an IP address can be automatically assigned to a computer on a line using a protocol known as DHCP. DHCP can assign IP addresses to many devices in a local area network, but in that situation, where each computer is physically located does not need to be associated to the IP address.

A media access code (MAC) address is also another way to assign a sort of serial number to a device that can connect to a network. A MAC address is typically burned into the microcontroller of the physical device and cannot be changed, and MAC addresses are assigned to manufacturers from a single database, so in theory, no two devices should have the same MAC address. Again, this poses the issue of each light head having a different serial number, so cloning of flash patterns from vehicle to vehicle would be an issue.

What is disclosed is a way to reduce the number of wires connected in the emergency warning vehicle, while solving the issue of easily being able to clone flash pattern configurations from vehicle to like vehicle in a multi-vehicle build.

Figure 3:
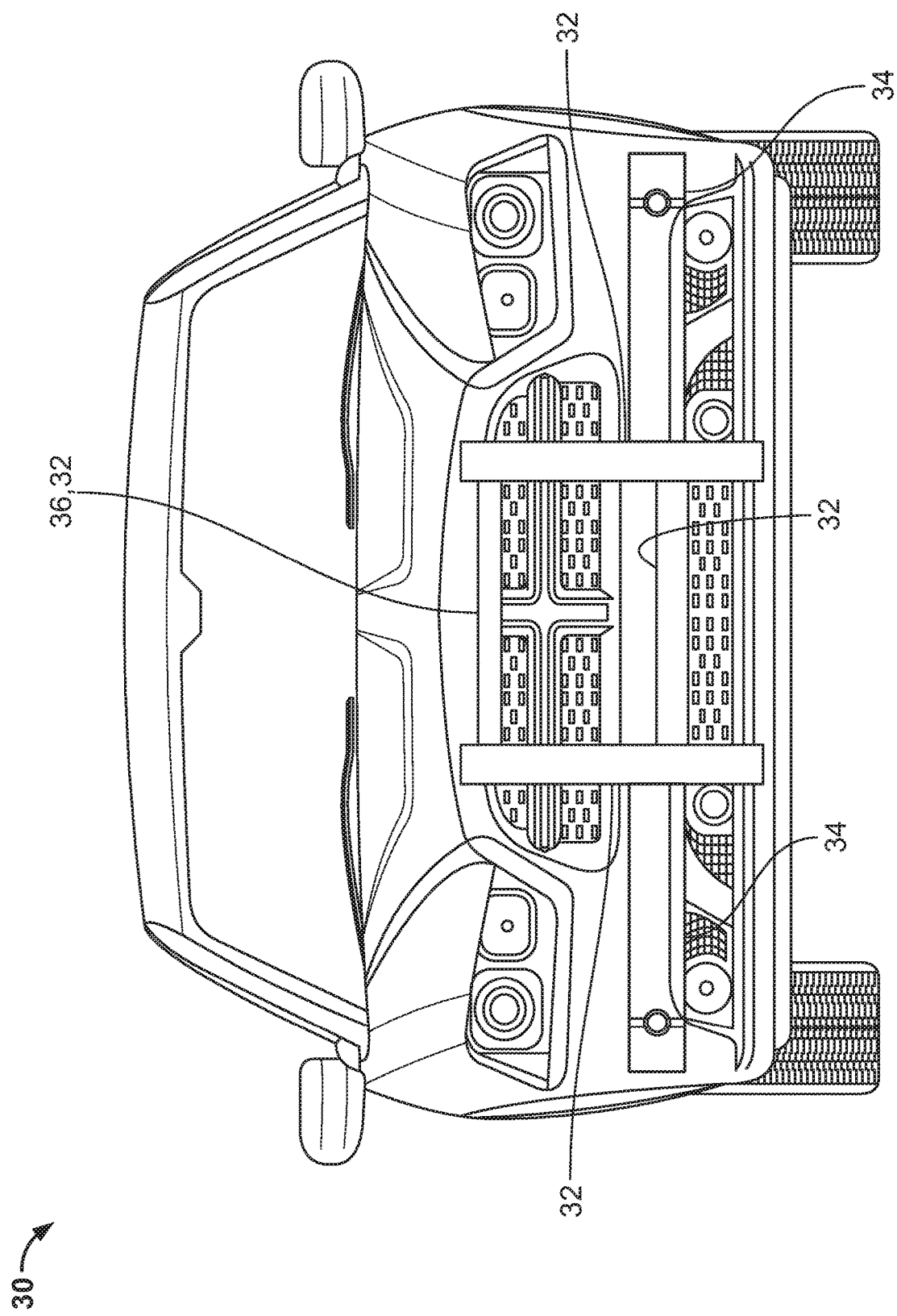
FIG. 3 illustrates a front of an example police vehicle.

A police vehicle will be provided as an example emergency vehicle herein, although other types of vehicles can be used. FIG. 3 shows a front of a typical police vehicle 30. This particular diagram shows a push bumper 32 installed on the vehicle 30, along with push bumper wing wraps/pit bars 34. The push bumper 32 is installed to protect the front end of the vehicle from damage when pushing another vehicle and the pit bars 34 are installed to protect the front of the vehicle when performing a pit maneuver to stop a vehicle being pursued.

Figure 4:
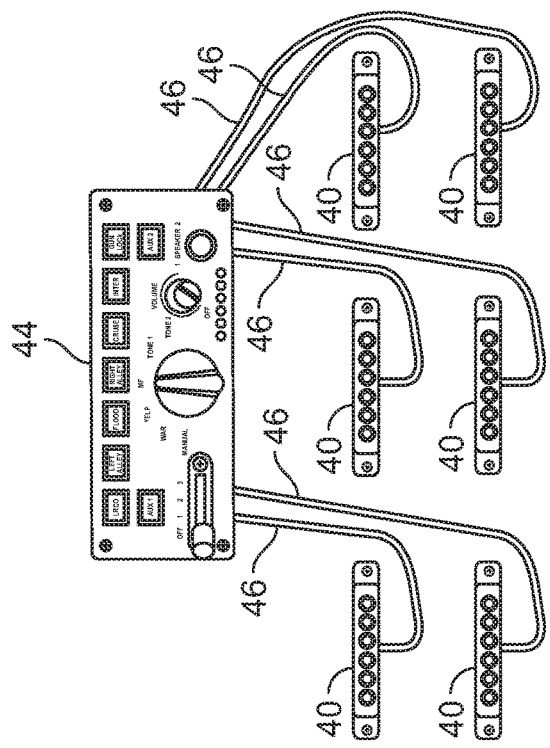
FIG. 4 illustrates an emergency warning system with activation wires connecting six, three color light heads and a controller/node.

Referring to FIGS. 3-4, consider 6 triple color light heads 40 mounted to the front of a police vehicle. Two light heads are mounted in the top channel 36 of the push bumper 32, two light heads are mounted to the outer left and right pit bars 34 for the front push bumper and two light heads are mounted in the left and right front head lamp housings. In a conventional emergency warning system 42, individual wires 46 for each color in each light head would be connected to an output on either a remote flasher node on the network or directly to the central controller 44 of the emergency lighting system. In this example, eighteen activation wires are required between the six, three color light heads and the controller/node, one for each color per head, as shown in FIG. 4.

Figure 5:
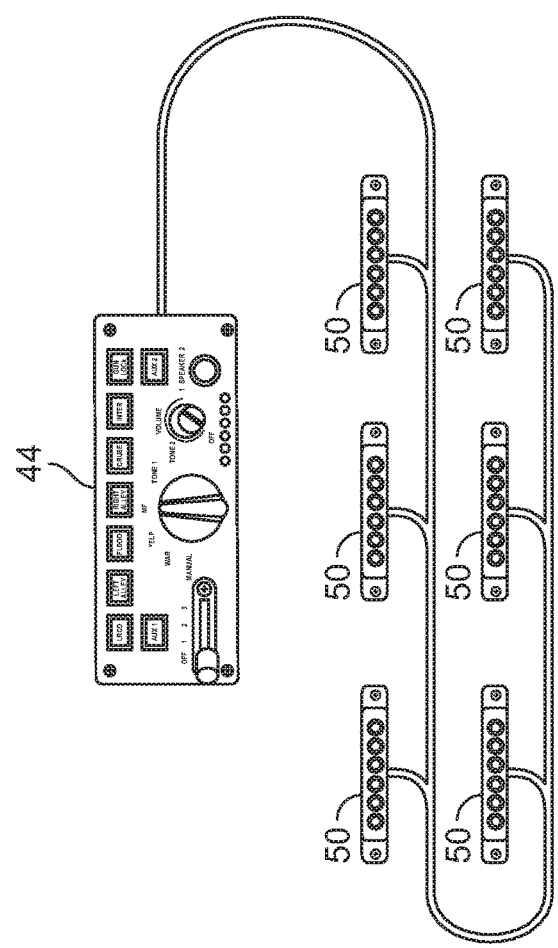
FIG. 5 illustrates an emergency warning system with six, three color light heads connected serially on a single network.

Now consider the same front end emergency vehicle installation with 6 triple color light heads 50, as shown in FIG. 5, connected serially on a single network strung through the front end of the vehicle. One or two wires carry the digital communications signal and one wire carries power to the light heads. Battery or ignition power could also be carried individually to the light heads, but to minimize parasitic current draw from the light heads when the system 52 is not in use, turning off a single power wire going to all six light heads is the best way to eliminate/minimize parasitic draw or sporadic flashing due to electrical interference, as shown in FIG. 5.

Figure 6A:
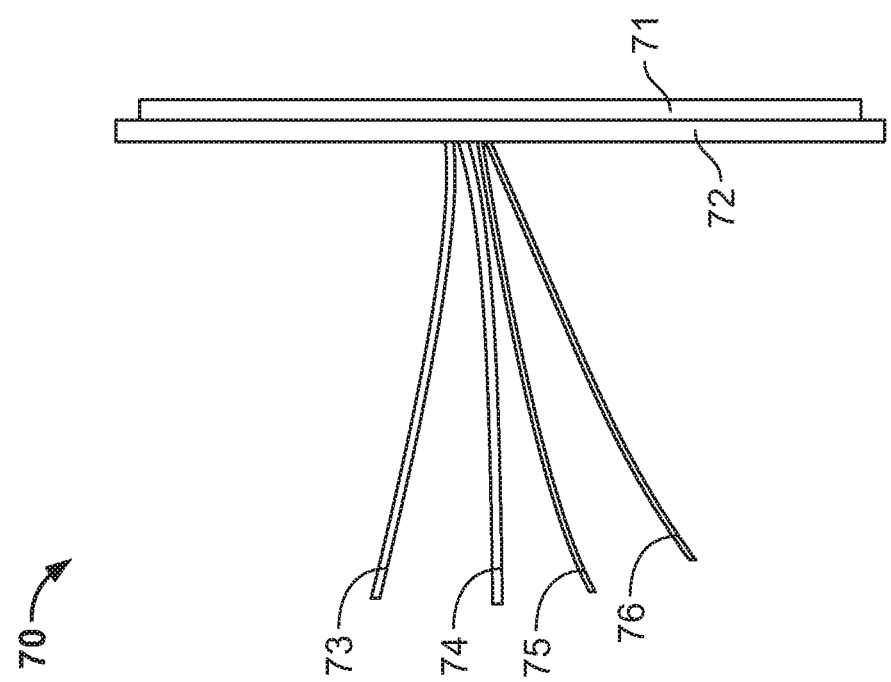
FIG. 6A illustrates light head connecting wires in a legacy warning system.
Figure 6B:
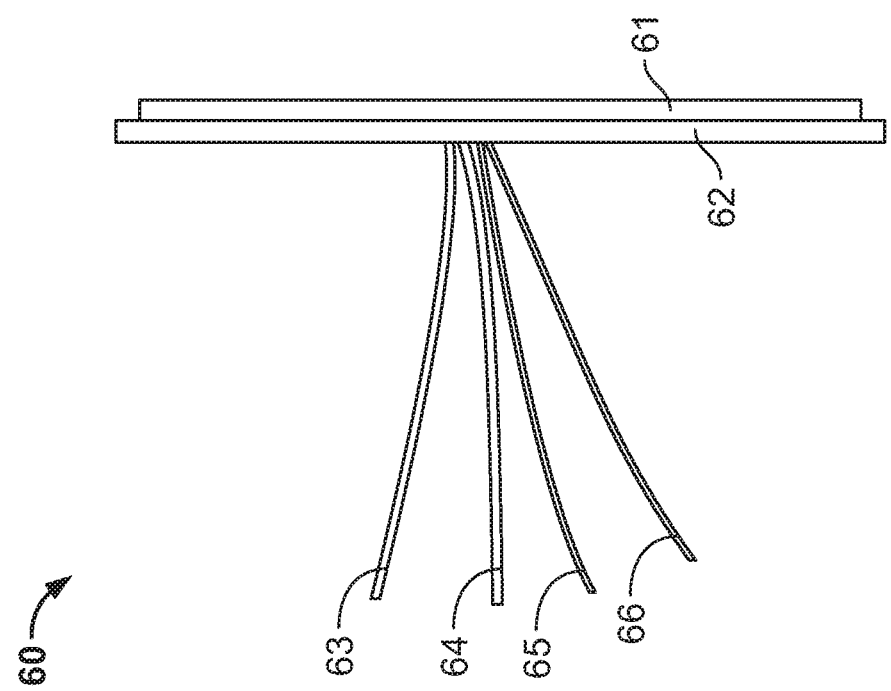
FIG. 6B illustrates light head connecting wires in a proposed smart peripheral lights warning system.

The diagrams in FIGS. 6A and 6B show the difference in the light head connecting wires in a legacy warning system 60 (FIG. 6A) and the proposed smart peripheral lights warning system 70 (FIG. 6B). Referring to FIG. 6A, the system 60 includes a front lens 61 and a rear housing 62. Wires 63, 64, 65 and 66 connect from the back of the light head to the rear housing 62. The wire 63 is a +12 VDC wire for color 1. The wire 64 is a +12 VDC wire for color 2. The wire 65 is a +12 VDC wire for color 3. The wire 66 is a ground wire. Referring to FIG. 6B, the system 70 includes a front lens 71 and a rear housing 72. Wires 73, 74, 75 and 76 connect from the back of the light head to the rear housing 72. The wire 73 is a 12 VDC power wire. The wire 74 is a positive serial communication line. The wire 75 is an optional negative serial communication line. The wire 76 is a ground wire. Because all of the light heads connect to the same serial communications lines and power lines, the wiring of the vehicle is simplified in terms of cable routing, but is made slightly more tedious when connecting onto the power and serial lines as at each connection point for a light head, a pigtail containing the serial communications line and light head power must be tapped off of the zone's cable.

Figure 7:
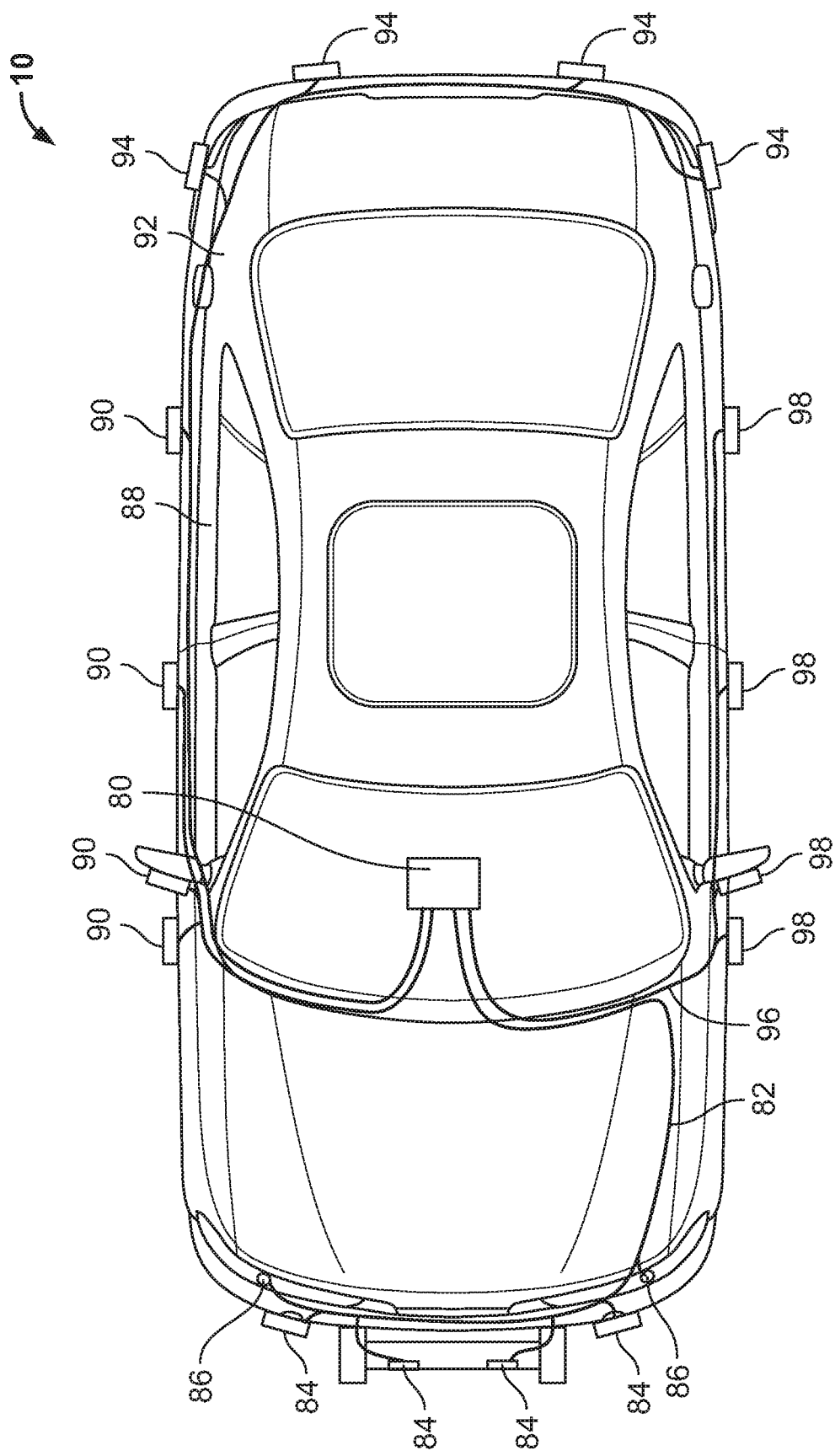
FIG. 7 illustrates a cable routing for an emergency vehicle having a smart peripheral light head technology lighting system.

FIG. 7 shows the simplified cable routing for an emergency vehicle 10 having a smart peripheral light head technology lighting system. A central controller 80 has power and ground connections. A serial communications and power line 82 connects the central controller 82 and front light heads 84 and 86 located in a Zone 1 of the vehicle 10. The ground connection for the light heads 84 and 86 is local. A serial communications and power line 88 connects the central controller 80 and passenger side light heads 90 in a Zone 2 of the vehicle 10. A serial communications and power line 92 connects the central controller 80 and rear light heads 94 in a Zone 3 of the vehicle 10. A serial communications and power line 96 connects the central controller 80 and driver side light heads 98 in a Zone 4 of the vehicle 10.

Figure 8:
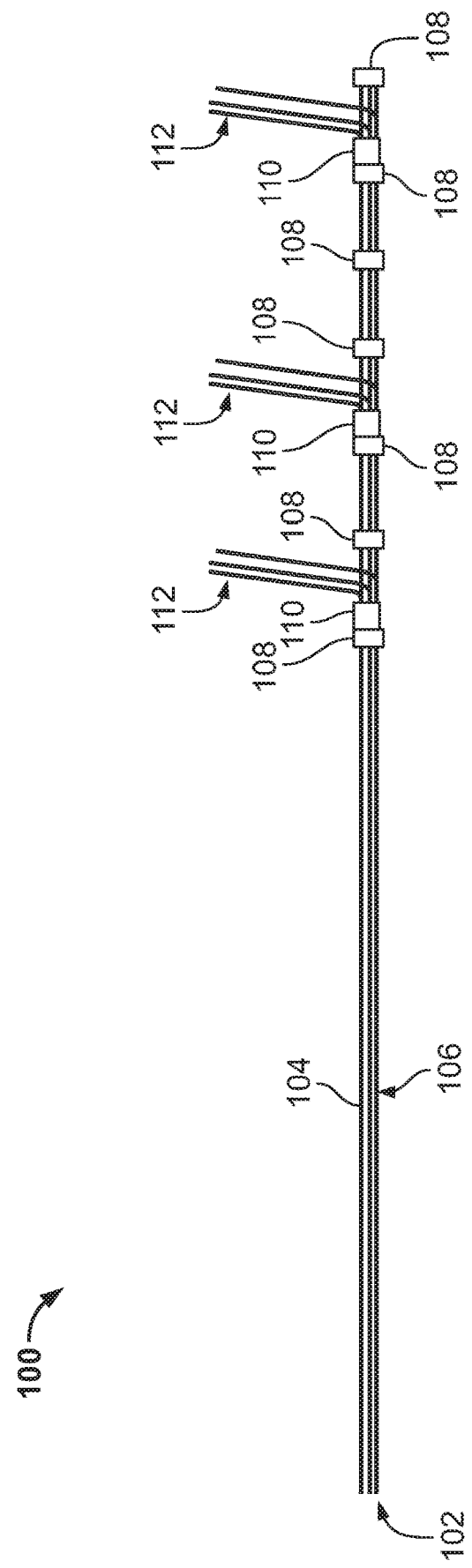
FIG. 8 illustrates an example mass production cable with pre-spaced insert molded connection points.

As shown in FIG. 8, to simplify connecting to the zone's communications line and power line, a method of creating mass produced cables with insert molding water tight connectors at equivalently spaced distances is provided herein. Pigtail leads can be connected at the required points on the line by plugging in the mating connector to the connector on the line and wiring the pig tails to the peripheral light head. Unused connection points on the main cable would remain sealed to prevent corrosion of the connectors. As shown in FIG. 8, the cable 100 is trimmed to length at one side 102, which is connected to the system controller after the cable has been routed through the vehicle. The cable 100 includes a power wire 104 and serial communication wires 106. Spaced insert molded waterproof connections 108 are provided along the cable 100. Mating waterproof connectors 110 are provided along the cable 100 from which pig tails 112 are wired to the peripheral light heads.

It can also be noted that when creating vehicular cable harnesses for emergency vehicles, the wire gauges in the cable harness are oversized for the application, which adds to the weight and cost of the vehicle. For example, a single tri-colored LED light head would have three 18 AWG wires connecting it to the controller, one for each color. Yet the LED light head only draws about 2 amps when flashing any particular color, and generally, only one color is flashed at any particular time. This means that even when the light head is actively flashing, the three wires combined are sized to carry a total of 45 amps, yet the light head is drawing 2 amps. The oversized wire is used to better withstand vibration, so legacy system cable harnesses add significant weight and cost to the vehicle when compared to a smart peripheral light system. For example, eight legacy light heads in Zone 1 would require 24 conductors of 18 AWG wire. If the heads were smart heads, the system would require one 12 AWG power wire and one or two 18 AWG serial communications wires. By utilizing a serial communications line, combined with a single power wire, the harness weight is significantly reduced. FIG. 8 shows an example of a smart peripheral light connecting cable 100.

Figure 10:
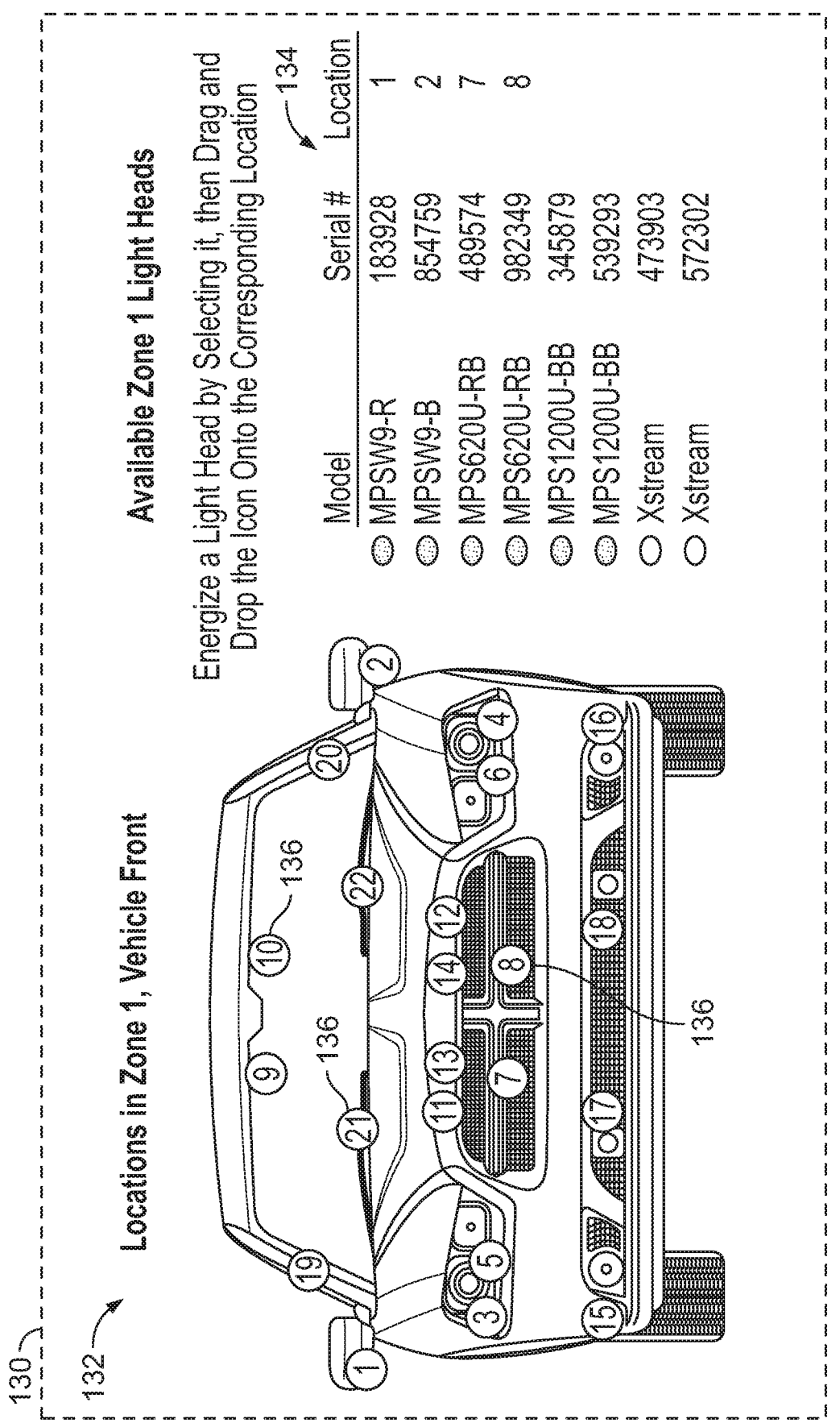
FIG. 10 shows an example screen that can be a graphical user interface used to drag and drop light heads in a front zone of a vehicle onto light head mounting locations.

To solve the issue of identifying the light head location and linking it to a location number in the zone, several methods are proposed. One possible example is depicted in FIG. 10. This can involve drag and drop programming software that is linked to the system controller either by wire or wirelessly.

Figure 9:
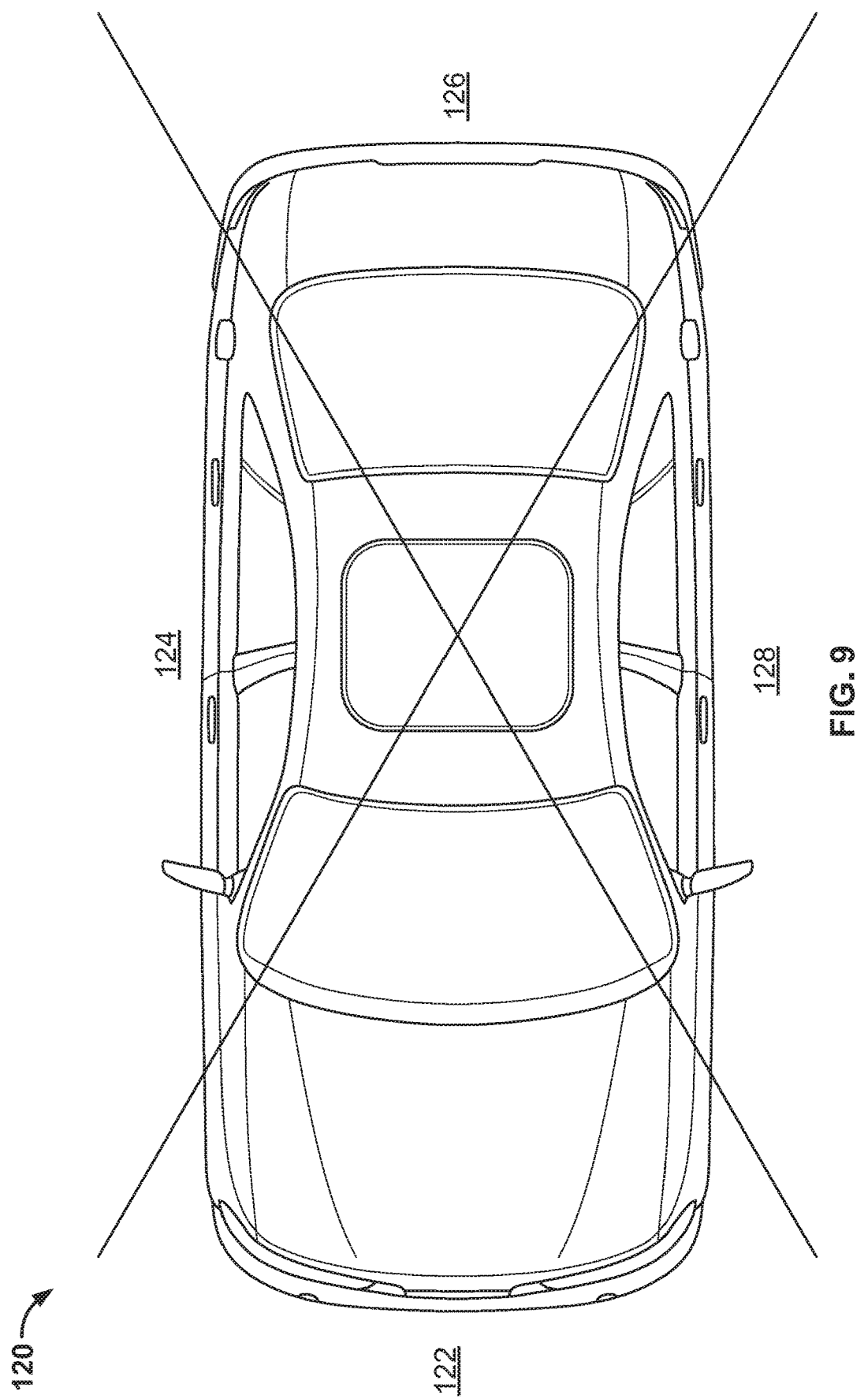
FIG. 9 schematically illustrates dividing an emergency vehicle into four zones or quadrants.

For this method, we will consider a four zone system 120, as illustrated in FIG. 9. A four zone system divides the vehicle into four quadrants 122, 124, 126, 128 around the vehicle 130, including the front quadrant 122, the passenger side quadrant 124, the rear quadrant 126 and the driver's side quadrant 128.

After installing the equipment, the emergency warning system installer loads a flash pattern data file into the system controller system. This file contains digital information that controls each light head with a specific address on the serial line and tells each light when to turn on, how bright to light, how long to stay on and what color.

Consider that a physical output exists for each zone, so the system controller in this application has four zone outputs. Often there are several peripheral light heads located in each zone for redundancy.

Although the system controller has flash pattern data, what the controller doesn't know is how many light heads are connected in each zone and where they are physically located. This is important as the light heads are often activated in groups around the vehicle and they often synchronize either in phase or out of phase with each other, when mounted in similar locations in the zone.

For example, it wouldn't be unusual for the light heads that are mounted inside the headlamp housings to flash back and forth or simultaneously between the driver and passenger sides of the vehicle. To learn what light heads in each zone are connected to the system controller, the system controller can put a zone into programming mode. When in programming mode, the system controller will apply power to power up all of the light heads in the zone. Then it will send an all call signal to the light heads to ask them to send back their individual serial numbers. The light heads respond by sending their serial numbers to the system controller.

The system controller now knows how many light heads are connected in a zone and it knows their individual serial numbers on the serial communications line, as it uses each light head's serial number to establish its system address on the line.

What the system controller does not know is where those light heads are physically mounted on the vehicle. This is important, because it must know physical location in order to control, pair and sync the light head flash patterns properly. This is especially important when building multiples of the same type of vehicle, so each vehicle is a clone of the other.

A way to enable the system controller to pair and coordinate light heads in a flash pattern is to assign a mounting location number to that light head. This mounting location number must be entered manually by the system installer while in programming mode and this mounting location number is the same from vehicle to vehicle in each zone. For example, the light head in the driver's side headlamp housing could be number 1 on the Zone 1 line and the light head in the passenger's side headlamp housing could be number 2 on the Zone 1 line. These numbers would match the corresponding mounting locations on another vehicle, so the system controller now knows how to control light heads 1 and 2 in Zone 1 in the same manner as the corresponding light heads on the other vehicle. This is how the system is able to clone peripheral light head control from like vehicle to like vehicle.

A tool such as a computer, tablet or mobile device using drag and drop GUI software would be a preferred method for the system installer to associate each peripheral light head with the mounting location on the vehicle. In this case, a mobile device is used. The installer would set the system in programming mode by depressing buttons on the system's control head located in the vehicle. For security, the system controller will not go into programming mode without direct access to system controller in the vehicle. The installer would then either wirelessly or by wired means connect the mobile device to the system controller in the vehicle.

Once connected, the installer would choose which zone to program. In this case, we will choose Zone 1. Once Zone 1 is activated in programming mode, all of the light heads in Zone 1 would turn on steady for 10 seconds and then turn off to indicate that the zone is in programming mode. The mobile device GUI would show the available peripheral light heads in Zone 1, along with their serial numbers and location number, if a location had already been programmed into the system from a previous session. If not, the location column would show all light heads connected in that zone.

The installer would then select a peripheral light head in the GUI. That light head would light steady for 3 seconds to indicate which light head it is in the zone. The installer would drag the icon for that light head to the location on the GUI that corresponds where the light head is physically mounted on the vehicle. The light head would flash two times to indicate that the system accepted the program change. The installer would repeat this process until all light heads are assigned a mounting location number. When completed, the right hand column showing unassigned light heads would be blank.

Using the GUI, the installer would switch to the next zone to be programmed and repeat the process until all zones on the vehicle are programmed. The installer would then take the system out of programming mode. The system could also time out of programming mode automatically after a defined time.

The diagrams of FIGS. 10-13 show example screens that could be the graphical user interfaces used to drag and drop light heads in a zone onto a mounting location. The system controller and/or the light heads would store the peripheral light head location information in non-volatile memory, so the system does not lose programming when the battery on the vehicle has failed or has been removed from the vehicle.

In FIG. 10, a GUI 130 is illustrated, showing 22 circled locations 136 locations on a depiction 132 of the front of the vehicle (zone 1) to which available zone 1 light heads can be dragged and dropped from an area 134 of the GUI 130. In this example, the installer has associated four mounting locations 136 numbered 1, 2, 7 and 8 by dragging and dropping corresponding icons of light heads, and four more light heads have not yet been associated with mounting locations.

Figure 11:
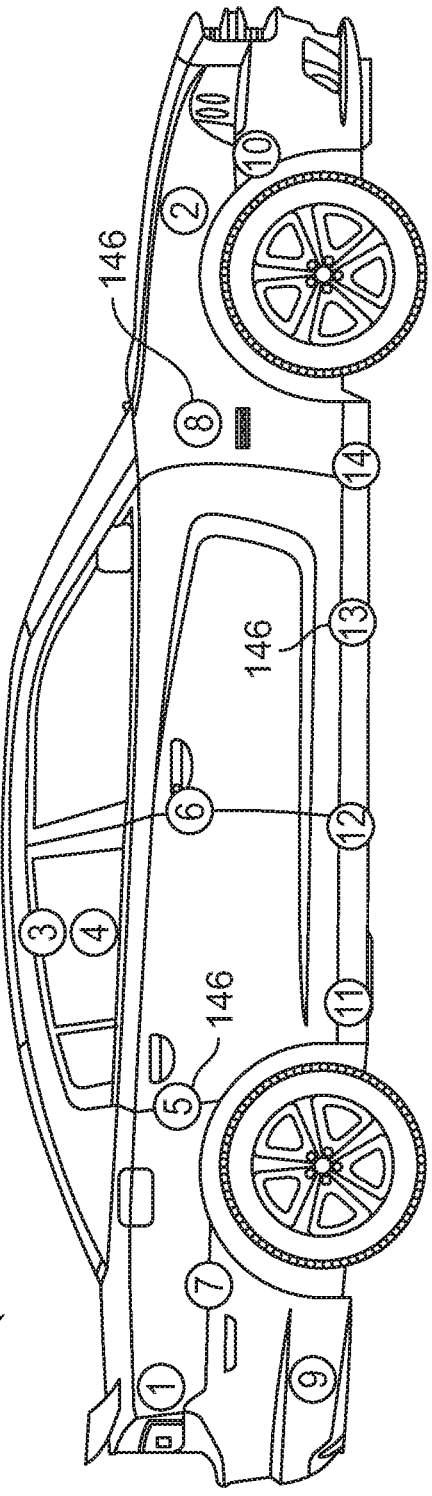
FIG. 11 shows an example screen that can be a graphical user interface used to drag and drop light heads in a passenger side zone of a vehicle onto light head mounting locations.

In FIG. 11, a GUI 140 is illustrated, showing 14 circled locations 146 on a depiction 142 of the passenger side of the vehicle (zone 2) to which available zone 2 light heads can be dragged and dropped from an area 144 of the GUI 140.

Figure 12:
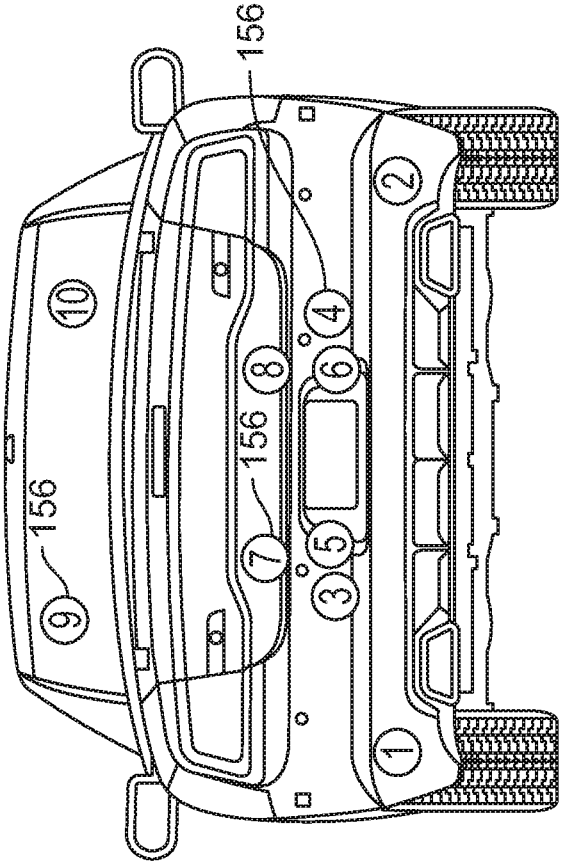
FIG. 12 shows an example screen that can be a graphical user interface used to drag and drop light heads in a rear zone of a vehicle onto light head mounting locations.

In FIG. 12, a GUI 150 is illustrated, showing 10 circled locations 156 on a depiction 152 of the rear of the vehicle (zone 3). In this example, as shown in the area 154 of the GUI 150, all of the light heads have been dragged and dropped and thereby associated with mounting locations.

Figure 13:
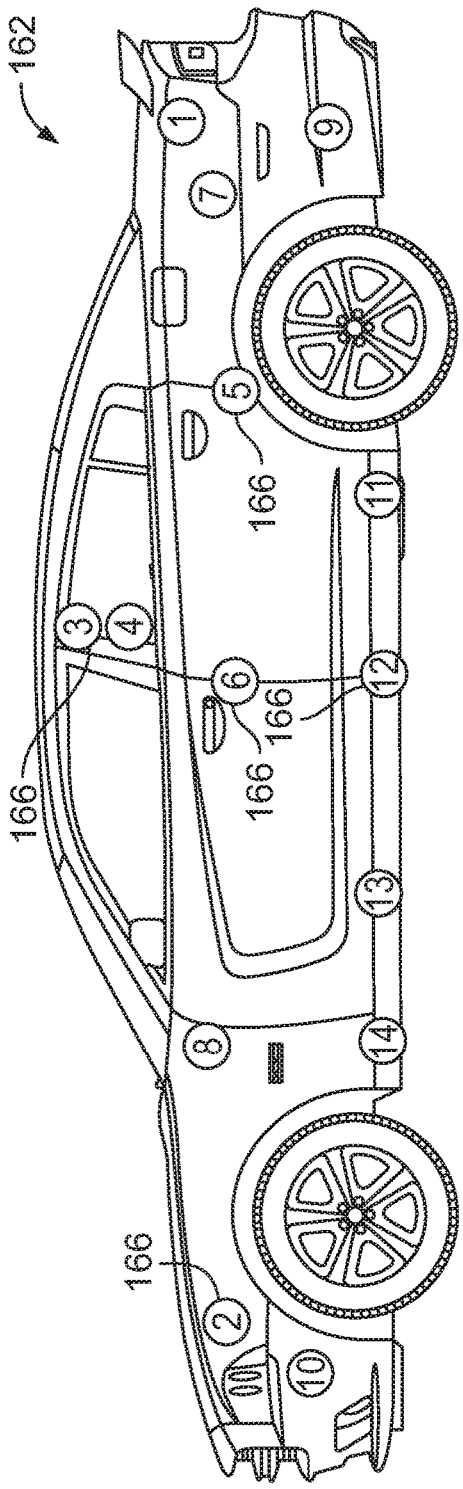
FIG. 13 shows an example screen that can be a graphical user interface used to drag and drop light heads in a driver side zone of a vehicle onto light head mounting locations.

In FIG. 13, a GUI 160 is illustrated, showing 14 circled locations 166 on a depiction 162 of the driver side of the vehicle (zone 4) to which available zone 4 light heads can be dragged and dropped from an area 164 of the GUI 160.

There can be alternative methods of programming light heads. One alternative method of programming light heads is to use an infrared remote device or use a mobile device or a computer with a near field communications wireless link or by sending visible light pulses directly to the light head. Like the programming method already outlined, peripheral light head programming could be achieved, by using a more manual method of programming the mounting location number into the light head directly by using a mobile device, a computer or an infrared remote.

With this programming method, the system installer would place a zone into programming mode, which applies continuous power to and lights all of the light heads in the zone for 10 seconds. When the light heads extinguish after 10 seconds the installer can use an infrared remote, hold it close to the front lens of the light head and depress the corresponding location number on the remote. The installer then hits the SAVE button on the remote causing the light head to store its location number in memory and send its location number through the zone network and to the system controller, where it is also stored.

Figure 14:
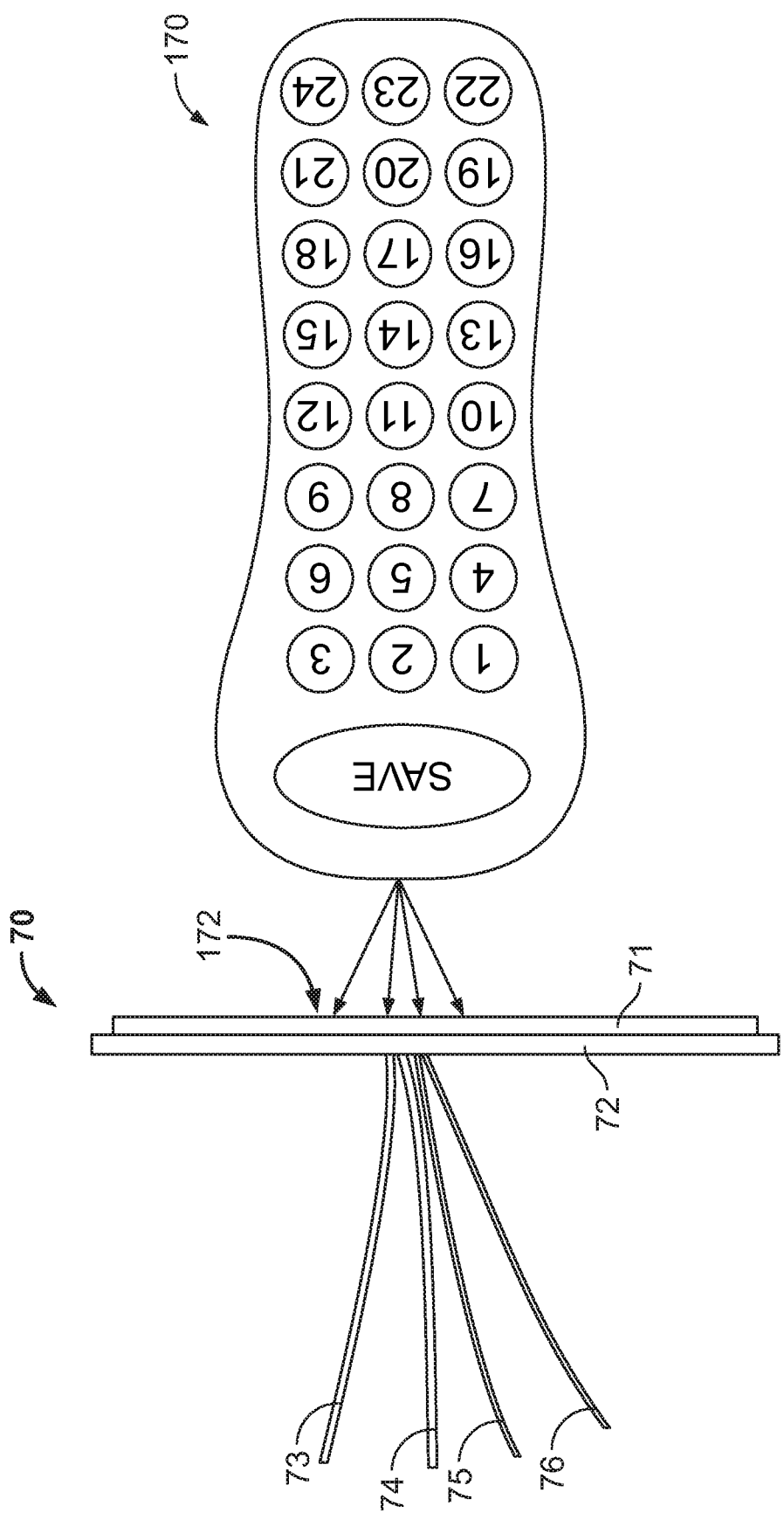
FIG. 14 illustrates an infrared or near field remote or mobile device that can communicate with a light or near field communications sensor of a smart peripheral lights warning system.

The system installer would repeat the process from light head to light head individually, to program all of the light heads in that zone. The system installer would need to write down the head locations/numbers to keep track of the head locations, especially when cloning vehicles. The programming process using a flashing light source (camera flash) from a mobile device with a remote control programming application would be very similar, except the programming would be completed using visible light or near field wireless communications, as shown in FIG. 14. As shown in FIG. 14, an infrared or near field remote or mobile device 170 communicates with a light or near field communications sensor 172 positioned behind the lens 71 of the system 70.

Other methods of programming the physical mounting locations can also be used, such as setting dip switches, programming through the rear wires prior to installation or using a magnetic probe to input the physical location code for the light heads.

The system controller and other computing devices described herein can include at least one microcontroller, also referred to as a processor, a system memory, system bus, and wired or wireless interface to a computer or hand held device. The system memory may be internal to the microcontroller or an external memory chip. The system memory can be non-transitory computer-readable media and include volatile and/or non-volatile memory. The system memory can store instructions that are executed by the processor to accomplish one or more of the functions described herein.

The system bus connects the system controller to the peripheral lights through a wired network bus. The system controller may have numerous network bus connections for the various zones of the vehicle. Example types of bus architecture for the network bus include, but are not limited to, CAN, LIN, and EIA-485 buses.

The system controller may also include an input/output controller for receiving and processing input from a number of other devices, including a touch user interface display screen, or another type of input device. Similarly, the input/output controller may provide output to a touch user interface display screen or other type of output device. The input/output controller connection may be wired (e.g. USB) or wireless (e.g. Bluetooth).

What is claimed is:

1. A peripheral lighting system for an emergency vehicle, comprising:
a plurality of light heads communicatively connected to one another in series by a serial communications line, the plurality of light heads being configured to be located at various positions on the emergency vehicle;
a system controller; and
a computing device programmed to program the system controller to control each of the plurality of light heads,
wherein the serial communications line extends from the system controller directly to each of the plurality of light heads;
wherein the system controller is programmed to individually control each of the plurality of light heads over the serial communications line; and
wherein the computing device is programmed to provide a graphical user interface that allows an icon for each of the plurality of light heads to be dragged to a location on the emergency vehicle.

2. A peripheral lighting system for an emergency vehicle, comprising:
a plurality of light heads communicatively connected to one another in series by a serial communications line, the plurality of light heads being configured to be located at various positions on the emergency vehicle;
a system controller; and
a computing device programmed to program the system controller to control each of the plurality of light heads,
wherein the serial communications line extends from the system controller directly to each of the plurality of light heads;
wherein the system controller is programmed to individually control each of the plurality of light heads over the serial communications line; and
wherein the computing device is programmed to provide a graphical user interface for each of a plurality of zones of the emergency vehicle, each of the graphical user interfaces displaying a corresponding one of the plurality of zones and allowing an icon for each of a set of the plurality of light heads associated with the corresponding zone to be dragged to a location on the displayed zone of the emergency vehicle.

3. The peripheral lighting system of claim 2, wherein the plurality of zones includes a vehicle front zone, a vehicle rear zone, a vehicle passenger side zone, and a vehicle driver side zone.

4. The peripheral lighting system of claim 1, comprising a cable connected at one side to the system controller, the cable including a serial communication wire.

5. The peripheral lighting system of claim 4, wherein the cable includes a plurality of serial communication wires.

6. The peripheral lighting system of claim 5, wherein the cable includes a power wire.

7. The peripheral lighting system of claim 4, comprising a waterproof connector associated with each of the plurality of light heads and connected to the cable.

8. The peripheral lighting system of claim 1, wherein at least one of the plurality of lights heads includes a local ground connection.

9. The peripheral lighting system of claim 1, wherein one or more of the plurality of light heads are triple color light heads.

10. The peripheral lighting system of claim 1, wherein the system controller is the only controller that is wired to any light head of the emergency vehicle.

11. A peripheral lighting system for an emergency vehicle, comprising:
a plurality of light heads communicatively connected to one another in series by a serial communications line, the plurality of light heads being configured to be located at various positions on the emergency vehicle;
a system controller; and
a remote device with a near field communications wireless link to program the system controller to control each of the plurality of light heads,
wherein the serial communications line extends from the system controller directly to each of the plurality of light heads;
wherein the system controller is programmed to individually control each of the plurality of light heads over the serial communications line; and wherein each of the peripheral light heads includes a near field communications sensor.

12. The peripheral light system of claim 11, wherein each of the near field communications sensors is positioned behind a lens of the corresponding peripheral light head.

13. A method of using a graphical user interface of a computing device, comprising:
    selecting a light head of an emergency vehicle lighting system from a plurality of light heads displayed on the graphical user interface;
    dragging, on the graphical user interface, an icon associated with the selected light head, to a first of a plurality of predefined light head mounting locations on an image of a first portion of the vehicle displayed on the graphical user interface; and
    dropping the icon at the first of the plurality of predefined light head mounting locations,
    wherein the dropping causes a controller of the emergency vehicle lighting system to be programmed to associate the selected light head with the first of the predefined light head mounting locations.

14. The method of claim 13, wherein the graphical user interface is a first graphical user interface, the method further comprising:
    causing the computing device to display a second graphical user interface including a second portion of the vehicle; and
    causing the controller to be programmed to associate a light head with a predefined mounting location at the second portion of the vehicle.

15. The method of claim 13,
    wherein the graphical user interface indicates that:
        one or more of the plurality of light heads have been associated with one or more of the plurality of predefined light head mounting locations; and
        one or more of the plurality of light heads have not been associated with one or more of the plurality of predefined light head mounting locations.

16. The method of claim 15, wherein, for each of the plurality of light heads, the graphical user interface displays a serial number and a model number.

17. A peripheral lighting system for an emergency vehicle, comprising:
    a plurality of light heads configured to be located at various positions on the emergency vehicle;
    a system controller;
    a serial communications line extending from the system controller to each of the plurality of light heads; and
    a computing device programmed to program the system controller to control each of the plurality of light heads,
    wherein the system controller is programmed to individually control each of the plurality of light heads over the serial communications line;
    wherein the computing device is programmed to provide a graphical user interface that allows an icon for each of the plurality of light heads to be moved on the graphical user interface and thereby be associated with a location on the emergency vehicle; and
    wherein the system controller is the only controller that is wired to any light head of the emergency vehicle.

* * * * *